United States Patent
Aubut

(10) Patent No.: US 10,135,962 B2
(45) Date of Patent: Nov. 20, 2018

(54) METHOD AND SYSTEM TO INTERCEPT ACCIDENTAL EMERGENCY CALLS IN A DEVICE REPAIR FACILITY

(71) Applicant: BlackBerry Limited, Waterloo (CA)

(72) Inventor: Michael Ryan Aubut, Cambridge (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 15/628,226

(22) Filed: Jun. 20, 2017

(65) Prior Publication Data

US 2017/0374185 A1 Dec. 28, 2017

Related U.S. Application Data

(60) Provisional application No. 62/355,670, filed on Jun. 28, 2016.

(51) Int. Cl.
| | |
|---|---|
| *H04B 7/00* | (2006.01) |
| *H04M 1/67* | (2006.01) |
| *H04M 3/38* | (2006.01) |
| *H04W 16/20* | (2009.01) |
| *H04W 48/20* | (2009.01) |
| *H04W 48/02* | (2009.01) |
| *H04W 84/04* | (2009.01) |

(Continued)

(52) U.S. Cl.
CPC .............. *H04M 1/67* (2013.01); *H04M 3/387* (2013.01); *H04W 16/20* (2013.01); *H04W 48/02* (2013.01); *H04W 48/20* (2013.01); *H04K 3/65* (2013.01); *H04W 76/50* (2018.02); *H04W 84/045* (2013.01)

(58) Field of Classification Search
CPC ..... H04W 16/20; H04W 48/02; H04W 48/20; H04W 76/50; H04W 84/045; H04M 1/67; H04M 3/387; H04K 3/65
See application file for complete search history.

(56) References Cited

U.S. PATENT DOCUMENTS

| | | | |
|---|---|---|---|
| 6,745,037 B1 | 6/2004 | Neumann | |
| 7,158,790 B1 * | 1/2007 | Elliott | ................. H04W 16/00 455/446 |

(Continued)

FOREIGN PATENT DOCUMENTS

| | | |
|---|---|---|
| EP | 1051053 A2 | 11/2000 |
| WO | 98/34421 A2 | 8/1998 |
| WO | 2006/075126 A1 | 7/2006 |

OTHER PUBLICATIONS

"26.7 Elementary procedures of mobility management", 3GPP Draft; 51010-1-D10_S26_07-S26_09, 3rd Generation Partnership Project (3GPP), Mobile Competence Center, Retrieved from http://www.3gpp.org/ftp/tsg_geran/WG3New_Terminal_Testing/Latest_draft_specs/clean/ , at paragraph 26.9.6.2.2, Jun. 2016.

(Continued)

*Primary Examiner* — Dominic Rego
(74) *Attorney, Agent, or Firm* — Moffat & Co.

(57) ABSTRACT

A system for intercepting accidental emergency calls in a facility, the system including at least one dead air network element configured within the facility, the at least one dead air network element providing a cellular signal stronger than live cellular signals as seen by electronic devices within the facility, wherein electronic devices connecting to the at least one dead air network element cannot reach emergency services.

19 Claims, 7 Drawing Sheets

(51) Int. Cl.
*H04K 3/00* (2006.01)
*H04W 76/50* (2018.01)

(56) References Cited

U.S. PATENT DOCUMENTS

| | | | | |
|---|---|---|---|---|
| 7,826,837 B1* | 11/2010 | Sylvester | .............. | H04W 24/06 |
| | | | | 455/423 |
| 2004/0023652 A1* | 2/2004 | Shah | .................... | H04W 48/18 |
| | | | | 455/426.2 |
| 2005/0020284 A1* | 1/2005 | Benco | .................. | H04W 16/18 |
| | | | | 455/456.6 |
| 2010/0273504 A1* | 10/2010 | Bull | .......................... | G01S 5/02 |
| | | | | 455/456.1 |
| 2012/0005472 A1* | 1/2012 | Nagai | ....................... | G06F 8/63 |
| | | | | 713/2 |
| 2012/0045205 A1* | 2/2012 | Perron | ............... | H04B 10/0795 |
| | | | | 398/48 |
| 2014/0378141 A1* | 12/2014 | Walley | ................ | H04W 36/023 |
| | | | | 455/437 |
| 2017/0164423 A1* | 6/2017 | Ross | ..................... | H04W 88/04 |
| 2017/0195940 A1* | 7/2017 | Boss | ..................... | H04W 40/22 |
| 2017/0251027 A1* | 8/2017 | Mendiratta | ........... | H04W 76/18 |
| 2017/0277186 A1* | 9/2017 | Ross | ..................... | H04W 4/026 |
| 2017/0280487 A1* | 9/2017 | Price | .................... | H04B 17/318 |

OTHER PUBLICATIONS

European Patent Office, Extended European search report for Application No. 17176657.9, published Jul. 11, 2017.

\* cited by examiner

METHOD AND SYSTEM TO INTERCEPT ACCIDENTAL EMERGENCY CALLS IN A DEVICE REPAIR FACILITY

FIELD OF THE DISCLOSURE

The present disclosure relates to emergency calls, and in particular relates to accidental emergency calls in device repair facilities.

BACKGROUND

In a mobile phone repair environment there is a constant risk of returned phones or devices accidentally making emergency calls. Such risk is due to either mishandling of the device or damage to the device.

Often, a phone sent to a repair facility has no subscriber identity module (SIM). When this device makes an emergency call, the emergency call puts an undue strain on the local emergency response teams as often the phones or devices dial and connect to an emergency operator with no one on the other end, and no SIM information to identify who the caller is.

Such emergency calls may necessitate emergency personnel being unnecessarily dispatched to the repair facility to ensure no actual emergency exists.

BRIEF DESCRIPTION OF THE DRAWINGS

The present disclosure will be better understood with reference to the drawings in which.

DETAILED DESCRIPTION

The present disclosure provides a system for intercepting accidental emergency calls in a facility, the system comprising: at least one dead air network element configured within the facility, the at least one dead air network element providing a cellular signal stronger than live cellular signals as seen by electronic devices within the facility, wherein electronic devices connecting to the at least one dead air network element cannot reach emergency services.

In accordance with the present disclosure, methods and systems are provided to mitigate the risk of accidental emergency calls from devices under repair. In accordance with one embodiment of the present disclosure, a repair shop may be analyzed to identify locations within the repair process where the problem of emergency 911 calls erroneously being made is most likely to occur. Then, in one example, a dead-air picocell may be deployed using the cellular standard within the area.

The picocell acts as a pseudo-cellular tower for the device in the restricted area and would appear as the strongest signal available. The devices under repair typically do not have a carrier specific SIM, so network selection is automatic and based on signal strength.

Thereafter, if a device was to initiate an emergency call for any reason, the dead-air cellular network would be the most likely cell selected by the device to make the call, effectively intercepting the emergency call.

To further increase the likelihood of each device selecting the dead-air network, in one embodiment, devices may be fitted with a standard test SIM which may be available in device repair shops.

In order to mitigate the chances that a legitimate 911 or emergency call would be intercepted, the picocell could be configured to discourage a device having an active carrier SIM to register to that picocell. When combined with the very low power output of the picocell, such provisions typically ensure that there are no instances of genuine emergency calls being intercepted.

Figure 1:
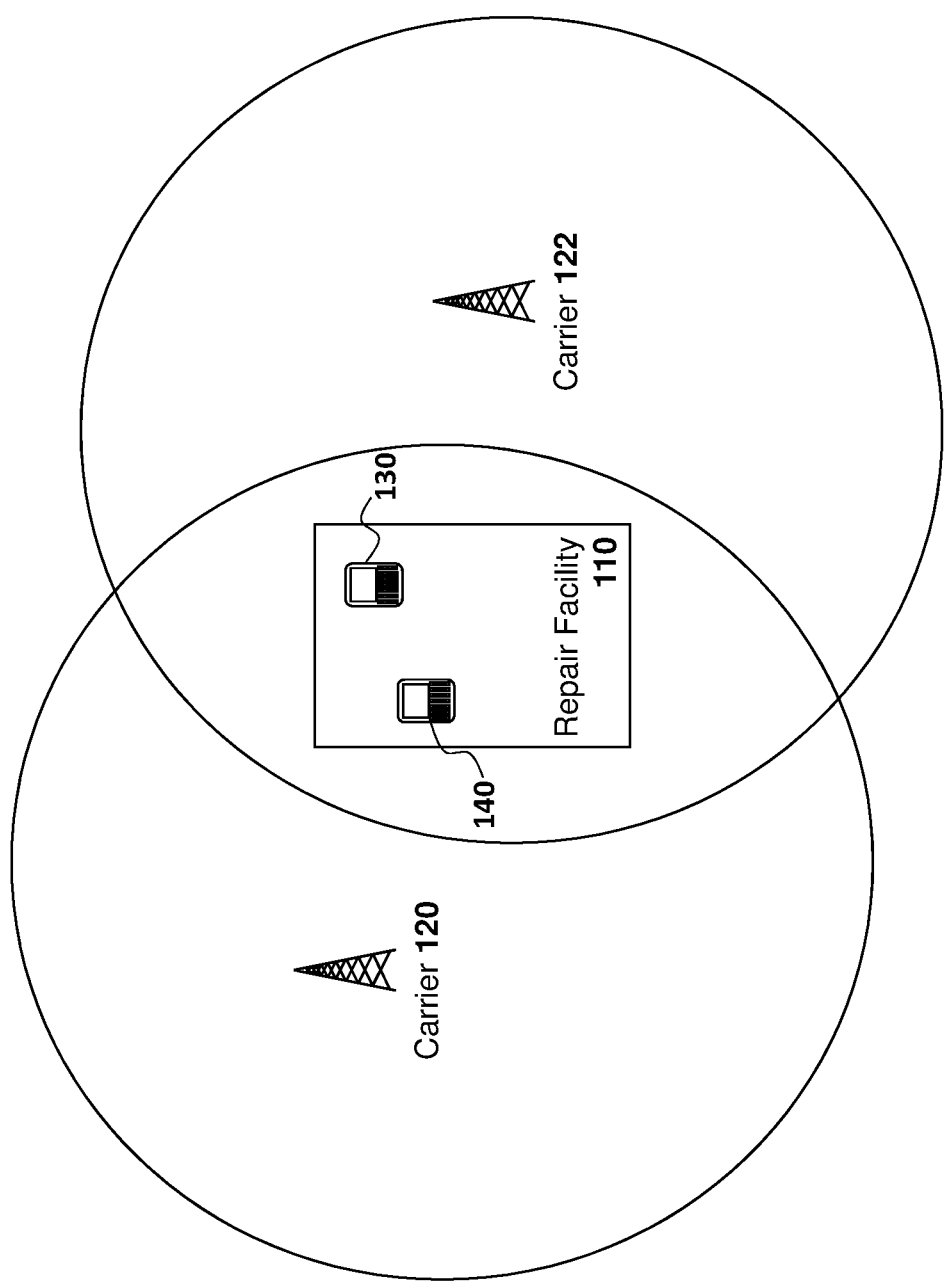
FIG. 1 is a block diagram showing a repair facility served by two cellular carriers.

Reference is now made to FIG. 1. The embodiment of FIG. 1 shows a typical repair facility 110 which can see cellular signals from two carriers. In particular, carrier 120 and carrier 122 both have the signals strong enough to be seen by devices within repair facility 110.

A device under repair 130 may, for some reason, initiate an emergency call. Device 130 may be any device that is capable of placing an emergency phone call. Examples of such devices include, but are not limited to, mobile cellular telephones, cellular enabled tablets, cellular enabled computers, cellular enabled electronic devices such as panels for use in alarm systems, medical alert electronic devices, among others. Such devices are referred to herein as electronic devices.

The reason that a device 130 may initiate an emergency call could be due to mishandling of the device at the repair facility 110 in some cases. In other cases, hardware or software faults on the device under repair 130 may cause the device to make an emergency call.

In the embodiment of FIG. 1, device 130 does not have a SIM and therefore when making an emergency call, it will attempt to connect to the network with the strongest signal. For example, if the signal seen by device 130 from carrier 122 is stronger than the signal received from carrier 120, device 130 will attempt to connect to carrier 122 in order to make the emergency call. This is seen, for example, in the process of FIG. 2.

Figure 2:
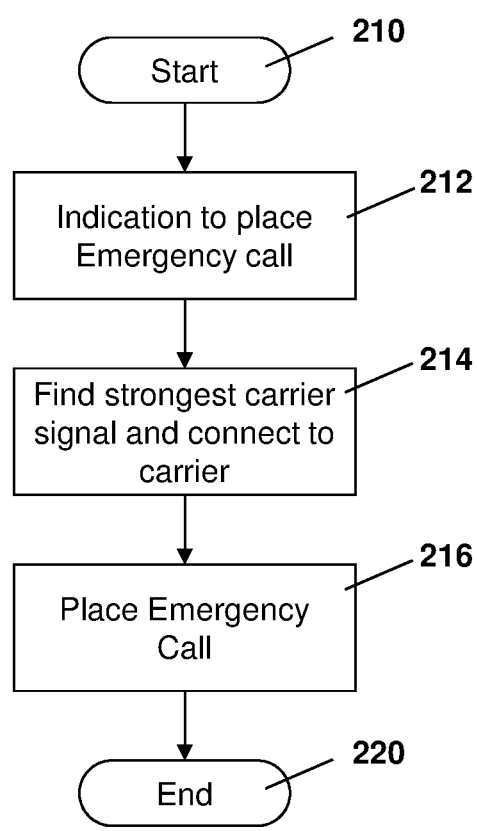
FIG. 2 is a process diagram showing connection of an electronic device without a subscriber identity module to a network for an emergency call.

FIG. 2 shows a process for a device without a SIM card for connecting to a network and making an emergency call. In particular, the process of FIG. 2 starts at block 210 and proceeds to block 212 in which an indication is received on the device to place an emergency call. As provided above, such indication may be due to mishandling of the device or due to a fault in the hardware or software of the device that is being repaired.

From block 212 the process proceeds to block 214 in which the device finds the strongest carrier signal and connects to that carrier.

The process then proceeds to block 216 in which the device utilizes the carrier it has connected to in order to place the emergency call.

The process then proceeds to block 220 and ends.

Referring again to FIG. 1, a further device 140 belongs to an employee of the repair facility 110. Such device may also be used to initiate an emergency call. However, since it belongs to an employee, the chances of the emergency call being legitimate are much higher.

In the embodiment of FIG. 1, device 140 includes a SIM card that is associated with a carrier. In most cases, device 140 would likely already be connected to the carrier on initiation of the emergency call. Even if not already connected, the device 140 would prefer to connect to the carrier associated with the SIM in the device. Thus, for example, device 140 may be associated with carrier 120 and therefore prefer to be connected to carrier 120.

If device 140 initiates an emergency call, the emergency call will be made over carrier 120 in general. This is true even if the signal strength as seen at device 140 from carrier 122 is stronger.

In order to mitigate an erroneous emergency call from being placed (for example at block 216 of FIG. 2) to an actual carrier, and therefore to emergency responders, the embodiments of the present disclosure utilize one or more network elements within the repair facility to intercept emergency calls. In particular, the embodiments below describe the use of a picocell to intercept calls. However, the present disclosure is not limited to any particular network element and in some embodiments a microcell, femto cell or picocell could equally be used in the embodiments described below.

In one embodiment, the picocell may be a Rhode and Schwarz CMU200 set up as a test base station with GSM repeater antennas. A custom software monitoring system could automatically monitor and handle the control of the base stations. However, this is merely an example and other hardware could be used.

Figure 3:
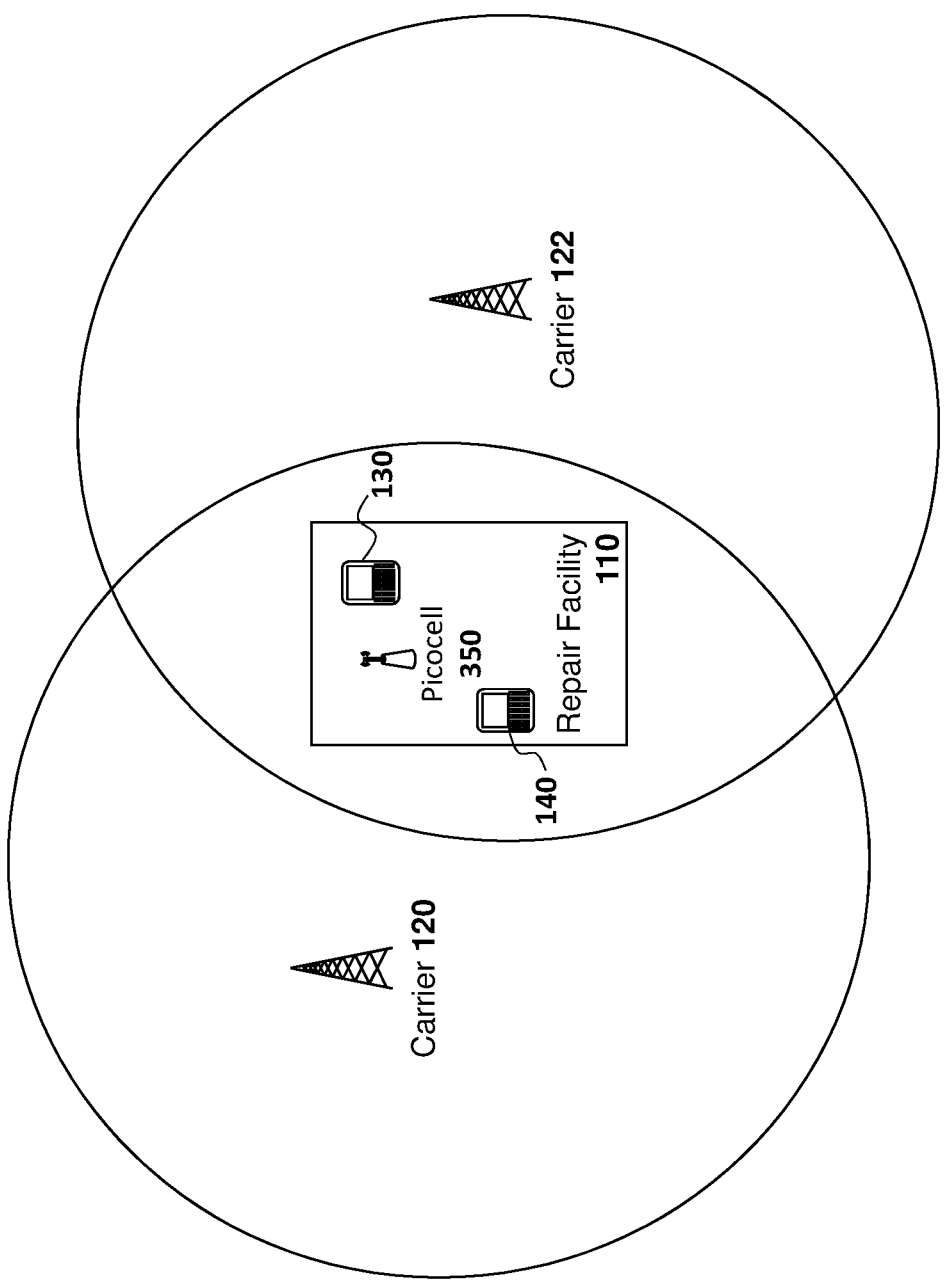
FIG. 3 is a block diagram showing a repair facility served by two cellular carriers with a further dead air network element configured within the facility.

Reference is now made to FIG. 3. In the embodiment of FIG. 3, repair facility 110 is served by carriers 120 and 122 and devices 130 and 140 can see signals from carriers 120 and 122.

However, in the embodiment of FIG. 3, one or more picocells 350 are added within repair facility 110. The picocell 350 acts as a low power pseudo-cellular tower and may utilize the cellular technology of the region in which the repair shop exists. For example, in one embodiment, the cellular technology may be the global system for mobile communications (GSM) and thus the picocell acts as a pseudo-GSM tower to devices in the restricted area of the repair facility 110.

Picocell 350 would act as a dead-air picocell, meaning that it is not connected to the Internet or to other cellular networks and therefore would not convey an emergency call to actual emergency service providers.

The embodiment of FIG. 3 shows only one picocell 350. However, an analysis of the repair facility 110 could determine the number of picocells, along with their location within the repair facility. The selection of the location, number of picocells, and signal strength of such picocells could be made based on the signal strength of carriers 120 and 122 in order to ensure that devices under repair would see a higher signal strength from picocell(s) 350 than seen from the actual carriers. The higher signal strength from picocell(s) 350 seen by devices within facility 110 ensures the connection to such picocells by devices under repair.

The power of picocell 350 could be low. For example, it has been found in tests that a transmit power of less than 1 µW would be all that is needed to extend cellular coverage within a single room. Further, such signal is significantly mitigated through the walls of the facility.

One exemplary configuration of the picocell 350 could be as follows:
Mobile network code (MNC)=1;
Mobile Country code (MCC)=random number between 001 and 080 with no repeats among neighboring picocells;
Network Bitstream=pseudo-random binary sequences (PRBS)
The broadcast channel and traffic channel could be set randomly;
The band is the same cellular band as local carriers.

In the above, the MCC is provided as a random number between 001 and 080. The use of the leading "0" within the MCC indicates a non-geographically specific code which will be interpreted as a test network, making the chances of a SIM enabled electronic device connecting to such picocell even lower.

Utilizing the environment of FIG. 3, a device under test such as device 130 would likely connect to picocell 350 when making an emergency call rather than with an actual carrier 120 or 122. For example, utilizing the process of FIG. 2, device 130 receives an indication to place an emergency call at block 212. Again, such indication is some erroneous trigger such as mishandling of the device or hardware or software faults.

The process then proceeds to block 214 which device 130 finds the strongest signal to connect to. In this case, the device 130 sees picocell 350 as providing the strongest signal and thus connects to picocell 350.

Subsequently, the process of FIG. 2 proceeds to block 216 in which the device 130 places the emergency call. In this case, the emergency call does not actually result in a connection to real emergency services, but rather is handled by software controlling picocell 350. In some cases, a log of the emergency call may be made and could be monitored by employees of the repair facility 110.

The process would then end at block 220.

Thus, as seen from the above, an erroneous emergency call by device 130 would not result in emergency service personnel being summoned.

Conversely, a legitimate device such as device 140 belong to an employee may also attempt to make an emergency call. In this case, a real emergency may exist. However, as device 140 is SIM enabled, even though the signal strength from picocell 350 is stronger than that of carriers 120 and 122, the device 140 will prefer its home network and therefore attempt to connect to carrier 120. Therefore, a legitimate emergency call will proceed through carrier 120 and will still reach emergency responders correctly.

In a further embodiment, device 130 may be SIM enabled utilizing a test SIM from the repair facility 110. In this case, the SIM could be inserted into the device at the test facility and could allow the device to prefer picocell 350 over other carriers.

Figure 4:
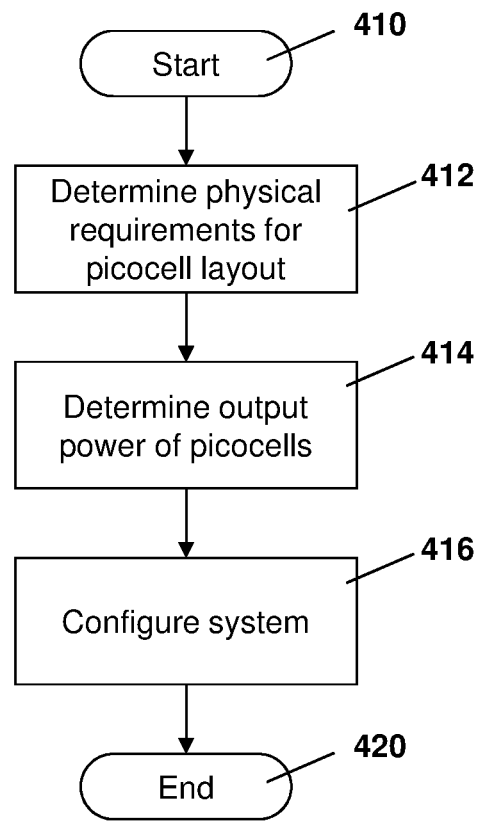
FIG. 4 is a process diagram showing configuration of picocells within a facility.

In order to ensure erroneous emergency calls are avoided, a test facility must be correctly configured with one or more picocells. Reference is now made to FIG. 4, which shows an example process of configuring the test facility.

The process starts at block 410 and proceeds to block 412 in which the physical requirements for the picocell layouts are determined. This may be based on where in the repair facility the devices are being repaired, the walls, the size of the rooms, among other factors.

Figure 5:
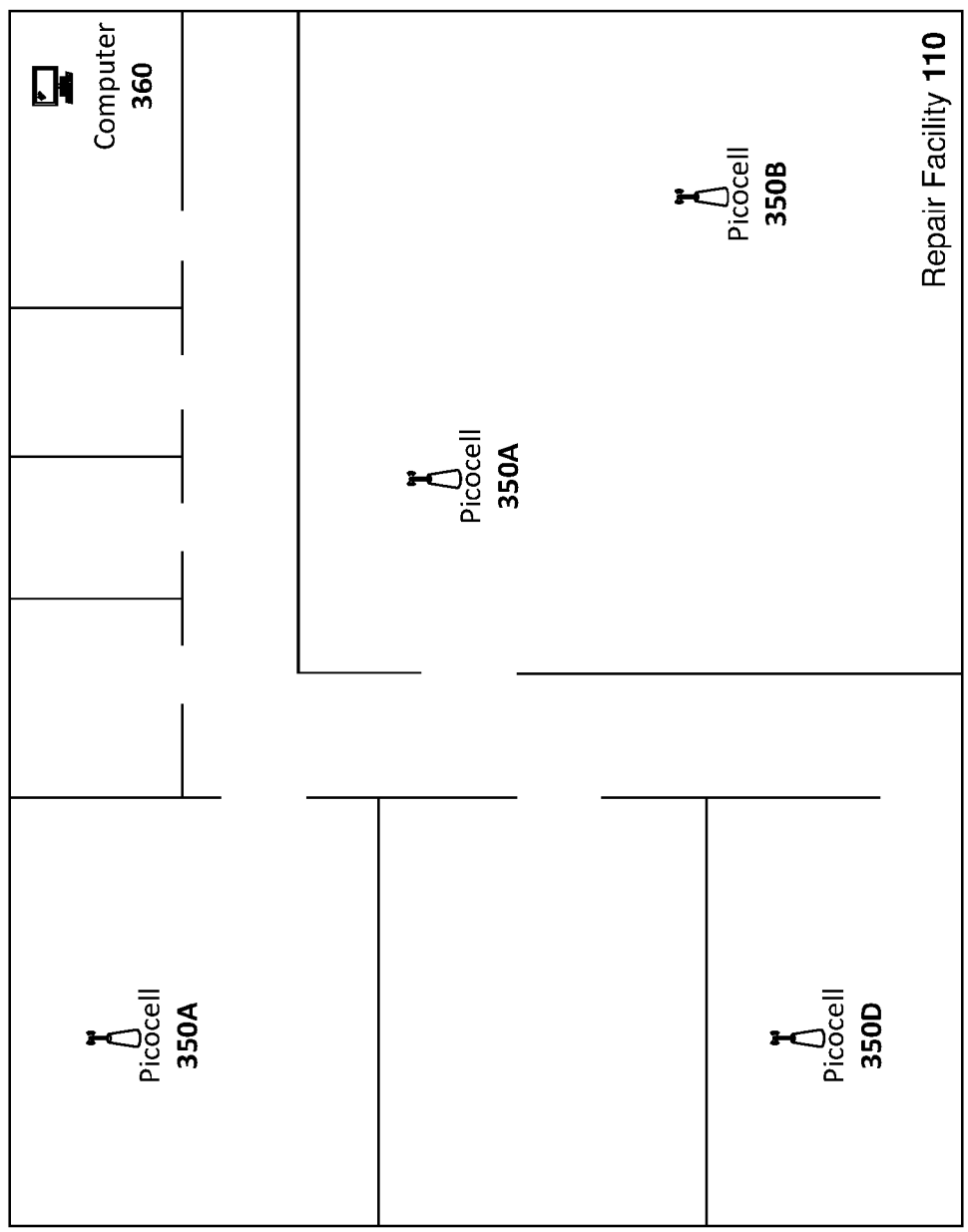
FIG. 5 is a block diagram showing an example configuration of multiple picocells within a facility.

For example, FIG. 5 shows an example repair facility in which a large room may require picocells 350A and 350B.

Further, a smaller room may require a picocell 350C and a second smaller room may require a picocell 350D. Other rooms in the facility do not have mobile devices under repair and therefore do not require picocells.

Referring again to FIG. 4, the process then proceeds from block 412 to block 414 in which the output power of each of the individual picocells is determined. The determination of the output power is made in order to ensure that mobile devices under repair within the rooms of the test facility see a stronger signal strength from at least one of the picocells than they see from local carriers.

The process then proceeds to block 416 in which the system is configured. In one example, the configuration may further include a computer 360 (FIG. 5) which is utilized to provide a software monitoring system that would monitor and handle the control of the picocells within the test facility.

From block 416 the process proceeds to block 420 and ends.

Thus, in accordance with the above, the dead-air picocell or picocells within the test facility serve to mitigate the accidental emergency calling typically seen in current repair facilities.

The picocells could be any network element. One simplified diagram of a picocell is shown with regard to FIG. 6.

Figure 6:
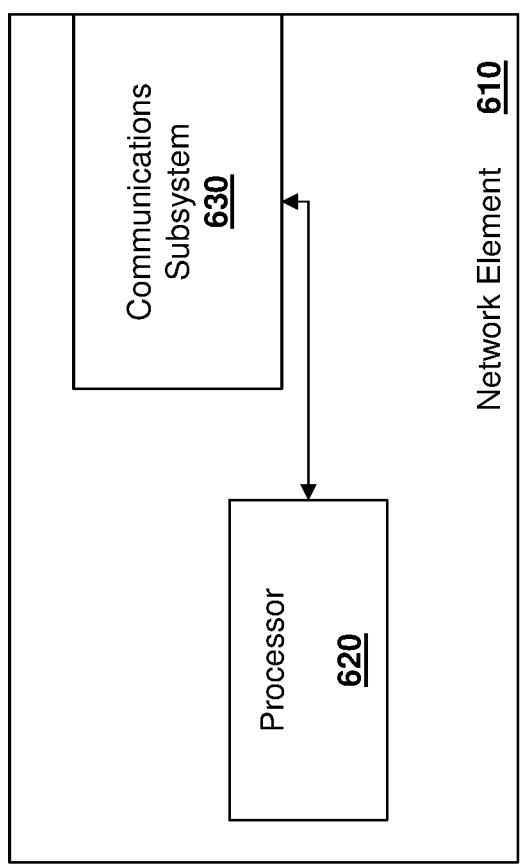
FIG. 6 is a block diagram of a simplified network element capable of being used with the methods and systems herein according to one embodiment.

In FIG. 6, network element 610 includes a processor 620 and a communications subsystem 630, where the processor 620 and communications subsystem 630 cooperate to perform the methods described above. Specifically, the processor 620 and communications subsystem 630 may be used to provide a dead air cellular base station such as that described above.

Communications subsystem 630 may provide for cellular communications. For example, communications subsystem 630 may provide a GSM base station as described above.

Communications subsystem 630 may further be used to communicate with a computer, such as computer 360 from FIG. 5 above, to allow coordination, logging, and configuration of multiple network elements.

Further, the above may be implemented for any electronic device. If the electronic device is a mobile device, one exemplary device is described below with regard to FIG. 7.

Mobile device 700 is typically a two-way wireless communication device having voice and data communication capabilities. Mobile device 700 generally has the capability to communicate with other computer systems on the Internet. Depending on the exact functionality provided, the mobile device may be referred to as a data messaging device, a two-way pager, a wireless e-mail device, a cellular telephone with data messaging capabilities, a wireless Internet appliance, a wireless device, a user equipment, or a data communication device, as examples.

Where mobile device 700 is enabled for two-way communication, it may incorporate a communication subsystem 711, including a receiver 712 and a transmitter 714, as well as associated components such as one or more antenna elements 716 and 718, local oscillators (LOs) 713, and a processing module such as a digital signal processor (DSP) 720. As will be apparent to those skilled in the field of communications, the particular design of the communication subsystem 711 will be dependent upon the communication network in which the device is intended to operate.

Network access requirements will also vary depending upon the type of network 719. In some networks network access is associated with a subscriber or user of mobile device 700. A mobile device may require a removable user identity module (RUIM) or a subscriber identity module (SIM) card in order to operate on a network. The SIM/RUIM interface 744 is normally similar to a card-slot into which a SIM/RUIM card can be inserted and ejected. The SIM/RUIM card can have memory and hold many key configurations 751, and other information 753 such as identification, and subscriber related information. Without a SIM card, the mobile device may still be capable of limited functionality, including placing an emergency call.

Figure 7:
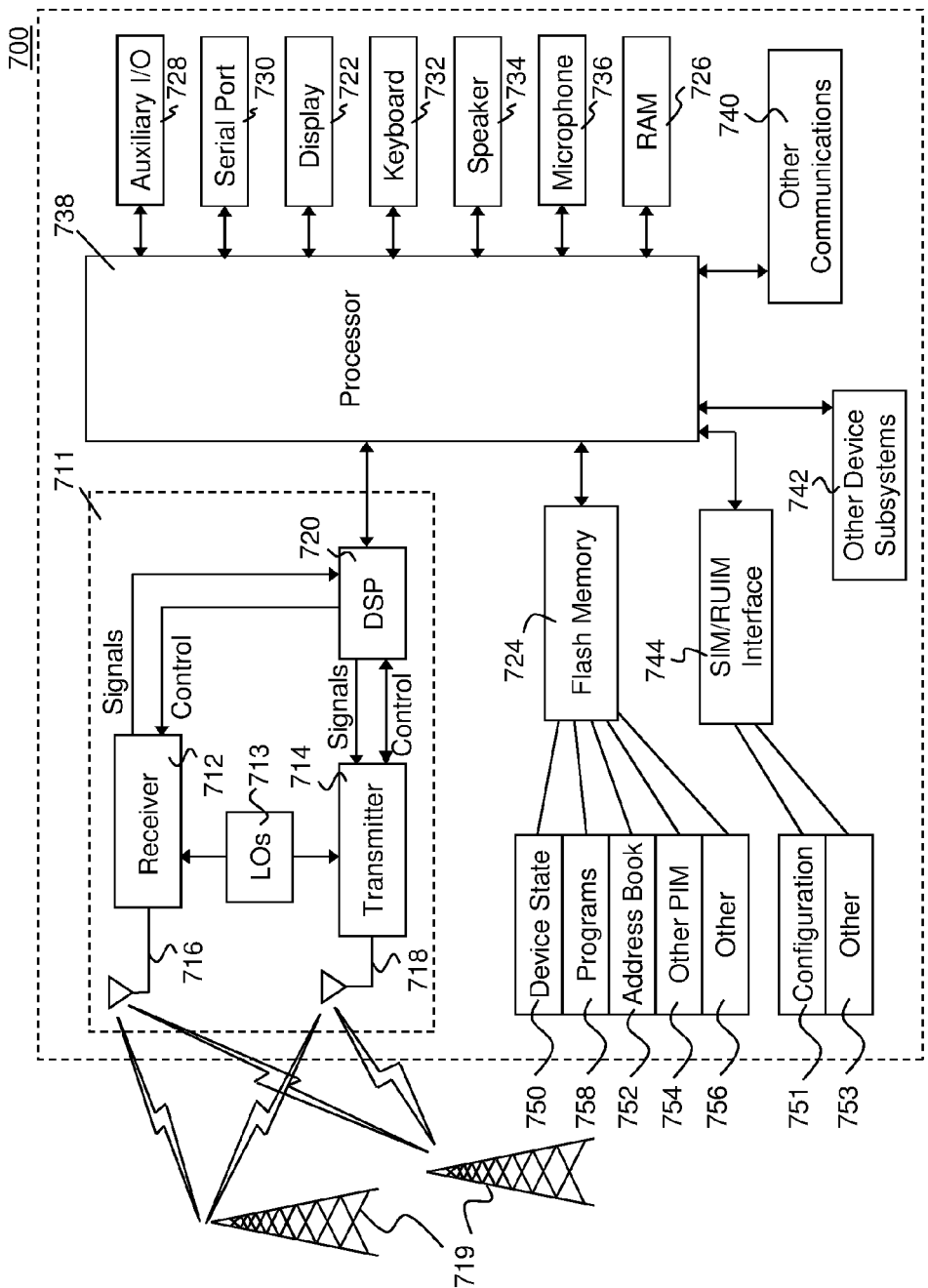
FIG. 7 is a block diagram of a mobile device according to one embodiment.

When required network registration or activation procedures have been completed, mobile device 700 may send and receive communication signals over the network 719. As illustrated in FIG. 7, network 719 can include multiple base stations communicating with the mobile device.

On device without a SIM, mobile device 700 may send and receive limited communication signals over the network 719, including emergency calls.

Signals received by antenna 716 through communication network 719 are input to receiver 712, which may perform such common receiver functions as signal amplification, frequency down conversion, filtering, channel selection and the like. Analog to digital (A/D) conversion of a received signal allows more complex communication functions such as demodulation and decoding to be performed in the DSP 720. In a similar manner, signals to be transmitted are processed, including modulation and encoding for example, by DSP 720 and input to transmitter 714 for digital to analog (D/A) conversion, frequency up conversion, filtering, amplification and transmission over the communication network 719 via antenna 718. DSP 720 not only processes communication signals, but also provides for receiver and transmitter control. For example, the gains applied to communication signals in receiver 712 and transmitter 714 may be adaptively controlled through automatic gain control algorithms implemented in DSP 720.

Mobile device 700 generally includes a processor 738 which controls the overall operation of the device. Communication functions, including data and voice communications, are performed through communication subsystem 711. Processor 738 also interacts with further device subsystems such as the display 722, flash memory 724, random access memory (RAM) 726, auxiliary input/output (I/O) subsystems 728, serial port 730, one or more keyboards or keypads 732, speaker 734, microphone 736, other communication subsystem 740 such as a short-range communications subsystem and any other device subsystems generally designated as 742. Serial port 730 could include a USB port or other port known to those in the art.

Some of the subsystems shown in FIG. 7 perform communication-related functions, whereas other subsystems may provide "resident" or on-device functions. Notably, some subsystems, such as keyboard 732 and display 722, for example, may be used for both communication-related functions, such as entering a text message for transmission over a communication network, and device-resident functions such as a calculator or task list.

Operating system software used by the processor 738 may be stored in a persistent store such as flash memory 724, which may instead be a read-only memory (ROM) or similar storage element (not shown). Those skilled in the art will appreciate that the operating system, specific device applications, or parts thereof, may be temporarily loaded into a volatile memory such as RAM 726. Received communication signals may also be stored in RAM 726.

As shown, flash memory 724 can be segregated into different areas for both computer programs 758 and program data storage 750, 752, 754 and 756. These different storage types indicate that each program can allocate a portion of flash memory 724 for their own data storage requirements. Processor 738, in addition to its operating system functions, may enable execution of software applications on the mobile device. A predetermined set of applications that control basic operations, including at least data and voice communication applications for example, will normally be installed on mobile device 700 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, calendar events, voice mails, appointments, and task items. Naturally, one or more memory stores may be available on the mobile device to facilitate storage of PIM data items. Such PIM application may have the ability to send and receive data items, via the wireless network 719. Further applications may also be loaded onto the mobile device 700 through the network 719, an auxiliary I/O subsystem 728, serial port 730, short-range communications subsystem 740 or any other suitable subsystem 742, and installed by a user in the RAM 726 or a non-volatile store (not shown) for execution by the processor 738. Such flexibility in application installation increases the functionality of the device and may provide enhanced on-device functions, communication-related functions, or both.

In a data communication mode, a received signal such as a text message or web page download will be processed by the communication subsystem 711 and input to the processor 738, which may further process the received signal for output to the display 722, or alternatively to an auxiliary I/O device 728.

A user of mobile device 700 may also compose data items such as email messages for example, using the keyboard 732, which may be a complete alphanumeric keyboard or telephone-type keypad, among others, in conjunction with the display 722 and possibly an auxiliary I/O device 728. Such composed items may then be transmitted over a communication network through the communication subsystem 711.

For voice communications, overall operation of mobile device 700 is similar, except that received signals may typically be output to a speaker 734 and signals for transmission may be generated by a microphone 736. Alternative voice or audio I/O subsystems, such as a voice message recording subsystem, may also be implemented on mobile device 700. Although voice or audio signal output is preferably accomplished primarily through the speaker 734, display 722 may also be used to provide an indication of the identity of a calling party, the duration of a voice call, or other voice call related information for example.

Serial port 730 in FIG. 7 may be implemented in a personal digital assistant (PDA)-type mobile device for which synchronization with a user's desktop computer (not shown) may be desirable, but is an optional device component. Such a port 730 may enable a user to set preferences through an external device or software application and may extend the capabilities of mobile device 700 by providing for information or software downloads to mobile device 700 other than through a wireless communication network. As will be appreciated by those skilled in the art, serial port 730 can further be used to connect the mobile device to a computer to act as a modem or for charging a battery on the mobile device.

Other communications subsystems 740, such as a short-range communications subsystem, is a further optional component which may provide for communication between mobile device 700 and different systems or devices, which need not necessarily be similar devices. For example, the subsystem 740 may include an infrared device and associated circuits and components or a Bluetooth™ communication module to provide for communication with similarly enabled systems and devices. Subsystem 740 may further include non-cellular communications such as WiFi or WiMAX.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A system for intercepting accidental emergency calls in a facility, the system comprising:
   at least one dead air network element configured within the facility, the at least one dead air network element providing a cellular signal stronger than live cellular signals as seen by electronic devices within the facility,
   wherein electronic devices connecting to the at least one dead air network element cannot reach emergency services.

2. The system of claim 1, wherein the at least one network element is a dead air picocell.

3. The system of claim 1, wherein the electronic devices include electronic devices under repair.

4. The system of claim 3, wherein the electronic devices under repair have no Subscriber Identity Module and are configured to connect to a strongest seen cellular signal for emergency calls.

5. The system of claim 3, wherein the electronic devices under repair have a test Subscriber Identity Module having the at least one dead air network element as a preferred base station to connect to.

6. The system of claim 3, wherein locations of the at least one dead air network element are configured within the facility based on the location of electronic devices under repair.

7. The system of claim 6, wherein the locations of the at least one dead air network element are further configured to ensure signal strength seen by devices under repair from the dead air network element remains above a signal strength of live cellular signals.

8. The system of claim 1, wherein the at least one dead air network element uses a global system for mobile communications (GSM) cellular signal.

9. The system of claim 1, wherein the at least one dead air network element is configured with a mobile country code identifying a test network.

10. The system of claim 1, wherein an electronic device with a subscriber identity module linked to a carrier will connect to a live cellular network over the at least one dead air network element.

11. A method for intercepting accidental emergency calls in a facility, the method comprising:
   providing at least one dead air network element within the facility, the at least one dead air network element providing a cellular signal stronger than live cellular signals as seen by electronic devices within the facility; and blocking electronic devices connected to the at least one dead air network element from reaching emergency services.

12. The method of claim 11, wherein the at least one network element is a dead air picocell.

13. The method of claim 11, wherein the electronic devices include electronic devices under repair.

14. The method of claim 13, wherein the electronic devices under repair have no Subscriber Identity Module and are configured to connect to a strongest seen cellular signal for emergency calls.

15. The method of claim 13, wherein the electronic devices under repair have a test Subscriber Identity Module having the at least one dead air network element as a preferred base station to connect to.

16. The method of claim 13, further comprising assigning locations to the at least one dead air network element within the facility based on the location of electronic devices under repair.

17. The method of claim 16, wherein the locations of the at least one dead air network element are assigned to ensure signal strength seen by devices under repair from the dead air network element remains above a signal strength of live cellular signals.

18. The method of claim 11, wherein the at least one dead air network element uses a global system for mobile communications (GSM) cellular signal.

19. The method of claim 11, wherein the at least one dead air network element is configured with a mobile country code identifying a test network.

* * * * *